June 23, 1970     I. D. BOYNTON ET AL     3,516,889
APPARATUS FOR MAKING FLUTED PACKAGES
Filed Oct. 20, 1965     8 Sheets-Sheet 1

INVENTORS.
Ira D. Boynton
Carmelo A. DiMaggio
James W. Healy
BY Harness, Dickey & Pierce
ATTORNEYS

United States Patent Office 3,516,889
Patented June 23, 1970

3,516,889
APPARATUS FOR MAKING FLUTED PACKAGES
Ira D. Boynton, Lexington, Carmelo A. Di Maggio, Waltham, and James W. Healy, Wakefield, Mass., assignors, by mesne assignments, to Diamond Crystal Salt Company, St. Clair, Mich., a corporation of Michigan
Filed Oct. 20, 1965, Ser. No. 498,663
Int. Cl. B31f 1/20; B32b 31/00
U.S. Cl. 156—357
18 Claims

ABSTRACT OF THE DISCLOSURE

The packaging machine cuts sheets from two rolls into front and back strips which are formed into fluted packages which are sealed at the bottom readily to receive filling material producing a plurality of the formed strips in a single operation.

---

The machine automatically slits sheets of paper into a plurality of strips and forms series of four flutes at spaced intervals in front strips which are joined to printed back strips. The fluted front strips are sealed at the bottom to form individual pockets which are filled with a condiment. This can be done in a single strip or in a plurality of strips which may have a flap extension on the back strip which is folded backwardly and secured thereto. The individual packages are then cut from each of the strips and assembled and packaged at a very high rate for shipment. As an example, in a four strip machine, the packages are severed and automatically packed into cartons at a rate of approximately 4000 packets per minute. The machine operates continuously without the necessity of stopping for the addition of a new supply of sheet material or a condiment with which the pockets are filled.

The machine comprises a plurality of sections which from the front to the rear end embodies automatic sheet supporting and unwinding turrets, a web printing section, registration section, air dancer section, flute forming and joining section, filling section, flute top closing section, flap folding and sealing section, cutoff section, carton loading section and drive assemblies therefor.

Accordingly, the main objects of the invention are: to provide a machine and method of operating on one or a plurality of strips to form pockets therein which are filled with a condiment; to split sheets of heat sealable material into a plurality of strips with registration means for aligning printing on the back strip with the flutes in the front strip which are sealed at the bottom to form pockets which are filled with a material; to provide spring fingers on a roller which moves the front strip into a slot in a slotted roller having a vacuum therewithin which holds the flutes in position while being moved into engagement with a back strip to which the flutes are sealed; to provide one or a plurality of pairs of front and back strips which continuously pass through the machine to have flute formed in the front strip which are sealed to the back strip, closed at the bottom to form pockets which are filled with a condiment without the necessity of interrupting any of the operations, and in general to provide a machine for producing condiment dispensing packets which is simple in construction, positive in operation and economical of manufacture.

Other objects and features of novelty of the invention will be specifically pointed out or will become apparent when referring, for a better understanding of the invention, to the following description taken in conjunction with the accompanying drawings, wherein:

FIG. 6 is a sectional view of the flute forming section of the structure illustrated in FIG. 1;

Figure 1:
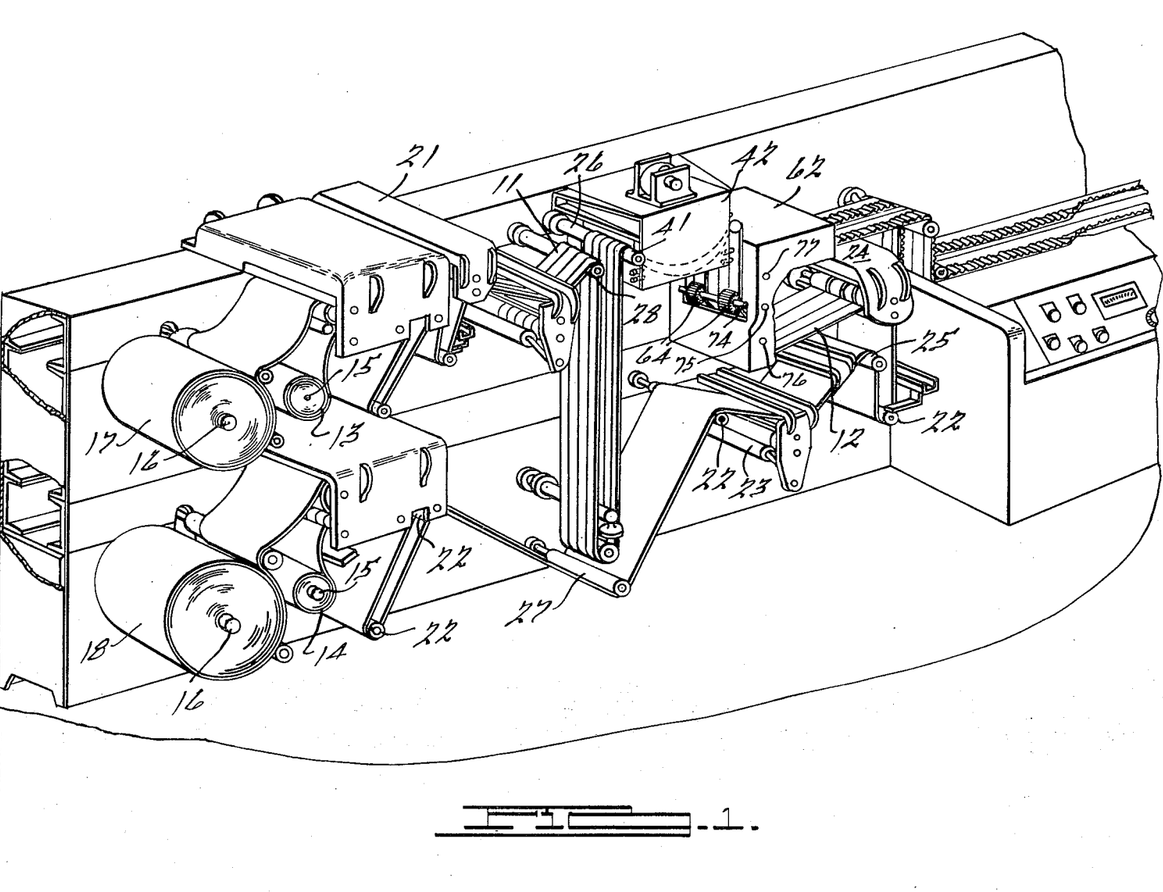
FIG. 1 is a perspective view of a machine having a plurality of stations for forming pockets in a plurality of pairs of strips from which they are advanced to a filling station.

Front strips 11 and back strips 12 are advanced from rolls of sheet material 13 and 14 at the front end of the machine. The rolls are mounted on spindles 15 on a turret carriage which has like spindles 16 which have fresh rolls 17 and 18 mounted thereon. The rolls 17 and 18 are in standby readiness and are fed into the machine, when the rolls 13 and 14 are near depletion, by a flying splice. The splice is under the control of the operator who initiates the operation when the roll 13 or 14 nears its end. A vacuum head segment holds the leading end of the new roll 17 or 18, which has a pressure sensitive material on the end. The end is swung downwardly in the direction of the sheet travel and is pressed against the sheet of the used roll near the end thereof to fix the new sheet thereto. At the same time a knife severs the sheet remaining on the used roll. After the splice is made, the turret is rotated to bring the new roll into the position previously occupied by the used roll. After the splice is made, the new roll is gradually accelerated to running speed to prevent the creation of a tension shock on the sheet as it is being advanced to other sections of the machine. To maintain registration of the printed copy on the back sheet, when splicing a new roll, the operation of the vacuum slicing head, knife and turret are timed after the operator has initiated the splicing operation, by a photo cell unit observing the register mark. The splicer vacuum head is driven through a slip clutch and held inoperative by a detent solenoid and catch arrangement until a signal is received from the operator and the photocell control unit. The separator knife is operated through a cam arrangement on the vacuum head segment.

From the unwind turret, the unregistered front sheet passes over a tension roll controlled by a magnetic brake which insures constant tension when passing over the web guide located immediately prior to the slitting station 21. In the slitting station the web is driven to split into four distinct 1¹³⁄₁₆ wide strips. The slitting stations are of the shear cut type using top and bottom knives in a conventional splitting arrangement such that the knives are spring loaded in both axial and radial directions and adjustable. The base rolls of the slitter are preferably driven 10% overspeed to assure adequate knife speed and tension control of the heat sealable paper or like sheet material. The paper or like material is pulled through the slitter by nip and draw roll arrangement which then feeds into the air dancer assembly. At the same time the back or register sheet, used to form the flat side of the package, travels from the unwind roll 15 through a series of idlers 22, a brake controlled register roll assembly 23 where it passes between a nip roll and a roll controlled by a magnetic brake route to the slitter 24. The brake control roll 23 serves the purpose of registering the printing on the back strip with the fluted front strip and to apply tension to the strip prior to its passing over the strip guide 25 into the slitter 24 which is similar to the slitter 21 above referred to.

Figure 2:
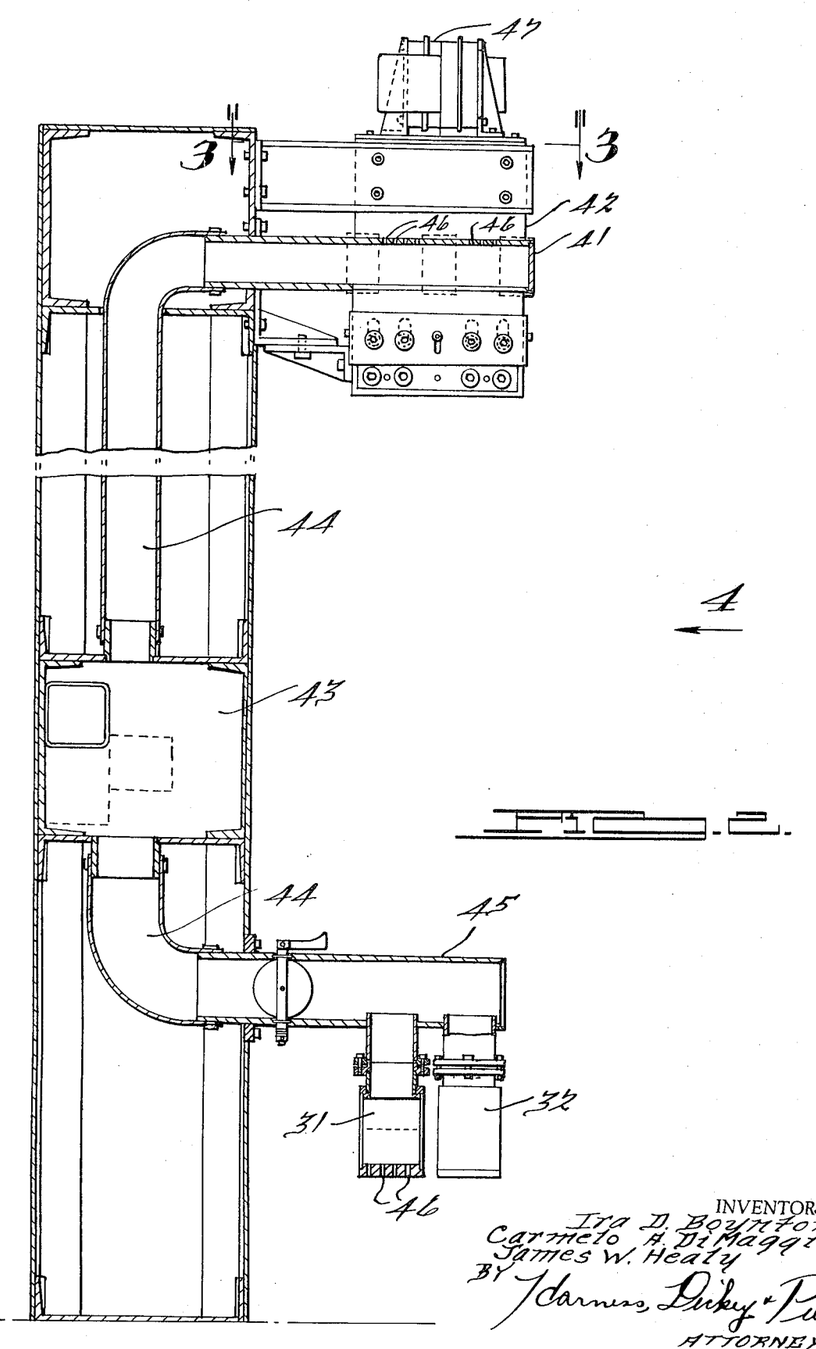
FIG. 2 is a sectional view of a dancing station wherein all of the inertia is removed from the front strips while being advanced.
Figure 3:
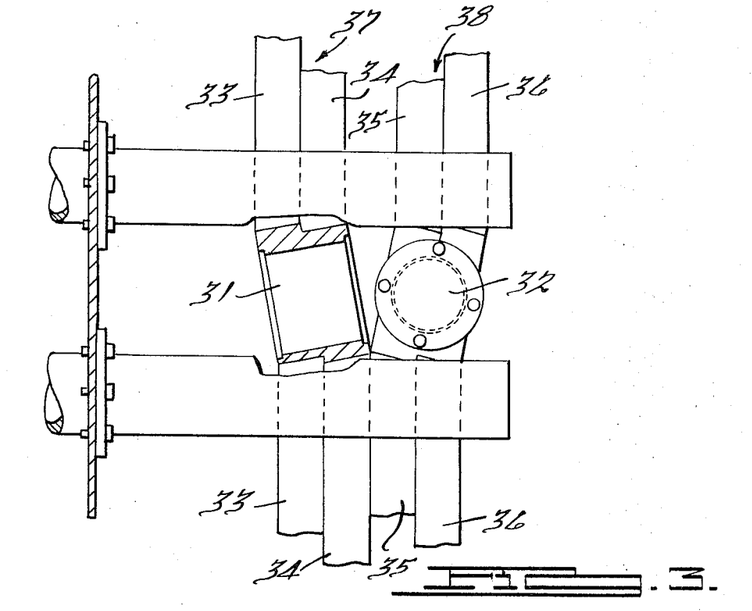
FIG. 3 is an enlarged sectional view of the structure illustrated in FIG. 2, taken on the line 3—3 thereof.
Figure 4:
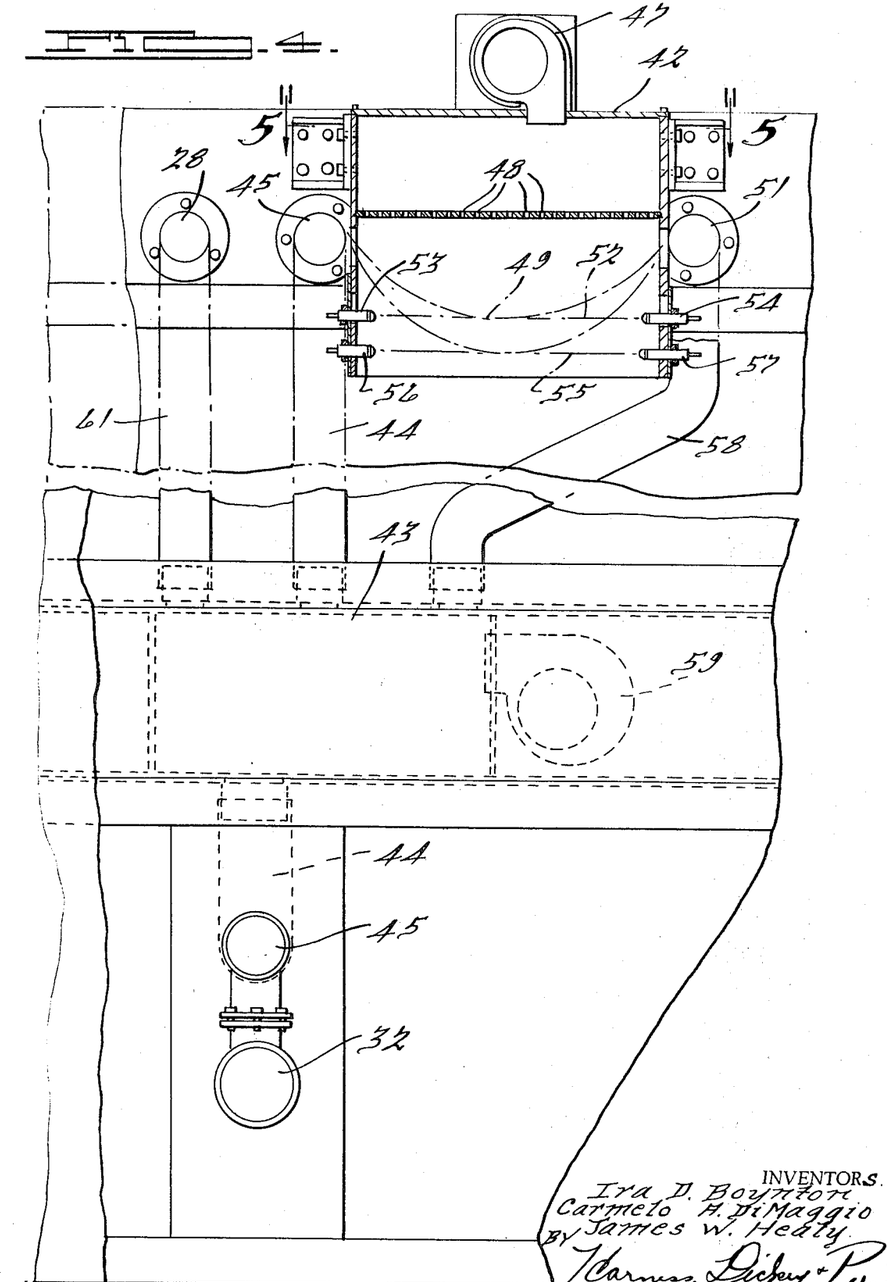
FIG. 4 is an enlarged broken view with parts in section of the structure illustrated illustrated in FIG. 2, as viewed from the point 4 thereof.
Figure 5:
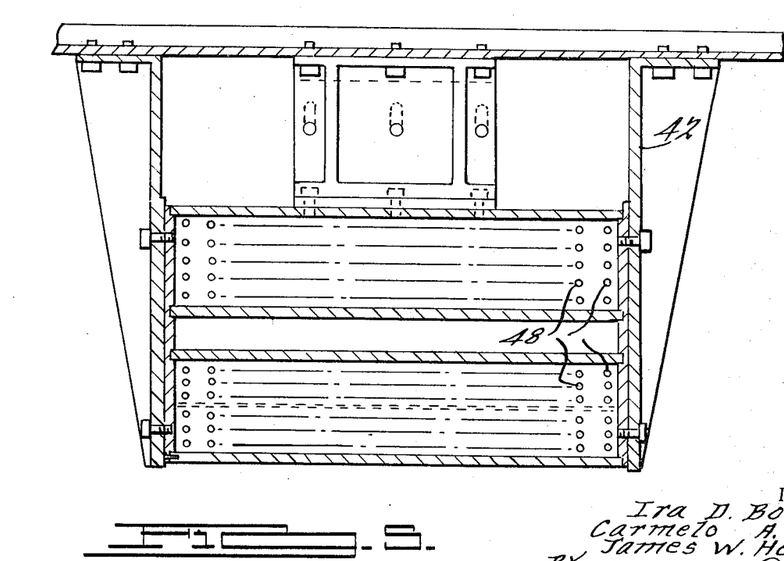
FIG. 5 is an enlarged sectional view of the structure illustrated in FIG. 4, taken on the line 5—5 thereof.
Figure 7:
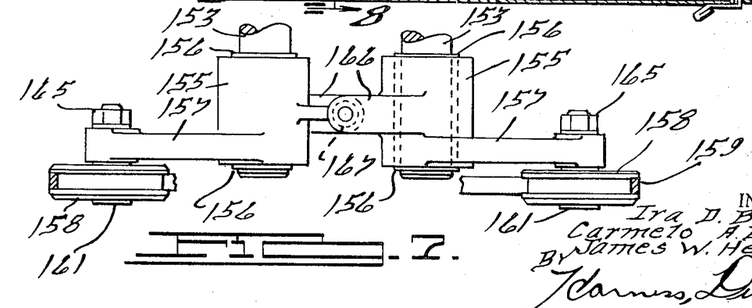
FIG. 7 is an enlarged broken sectional view of the structure illustrated in FIG. 6, taken on the line 7—7 thereof.
Figure 8:
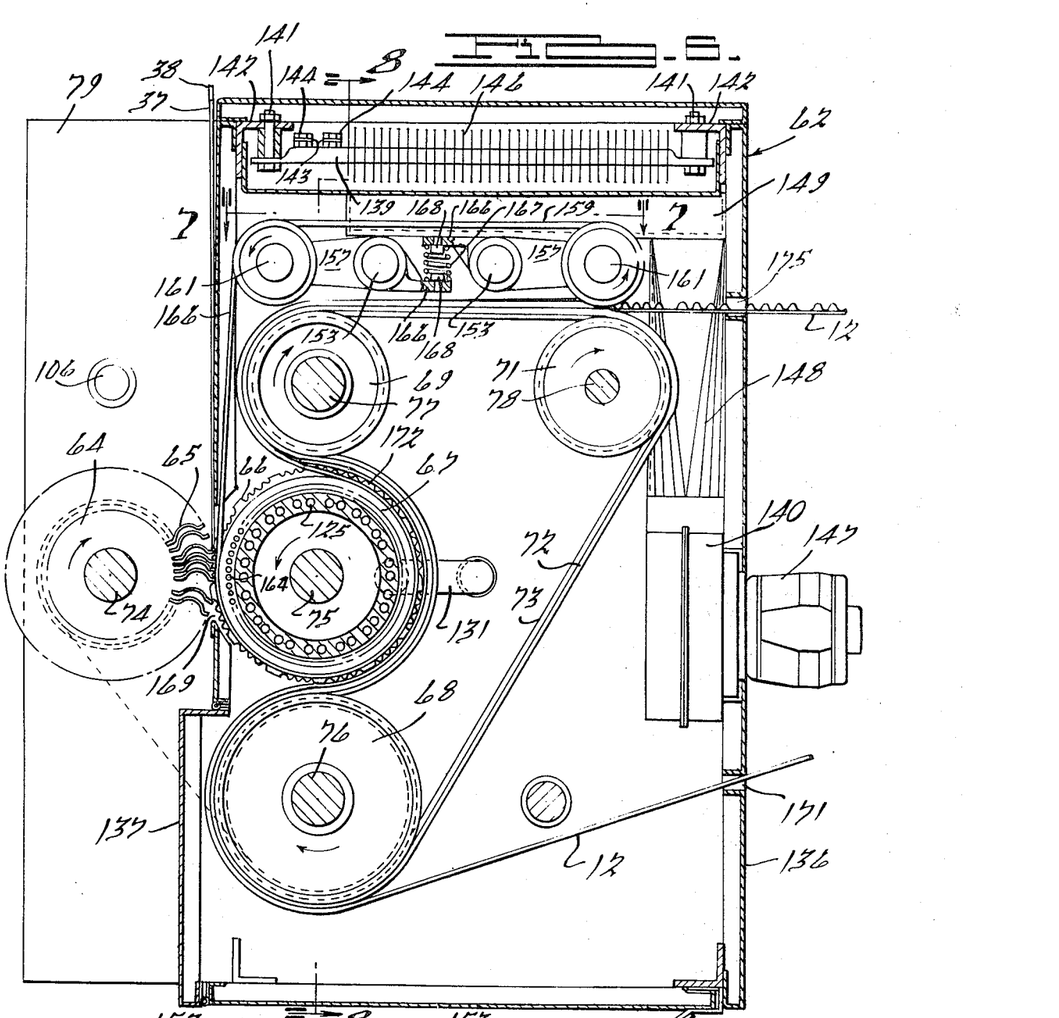
FIG. 8 is a sectional view of the structure illustrated in FIG. 6, taken on the line 8—8 thereof.
Figure 9:
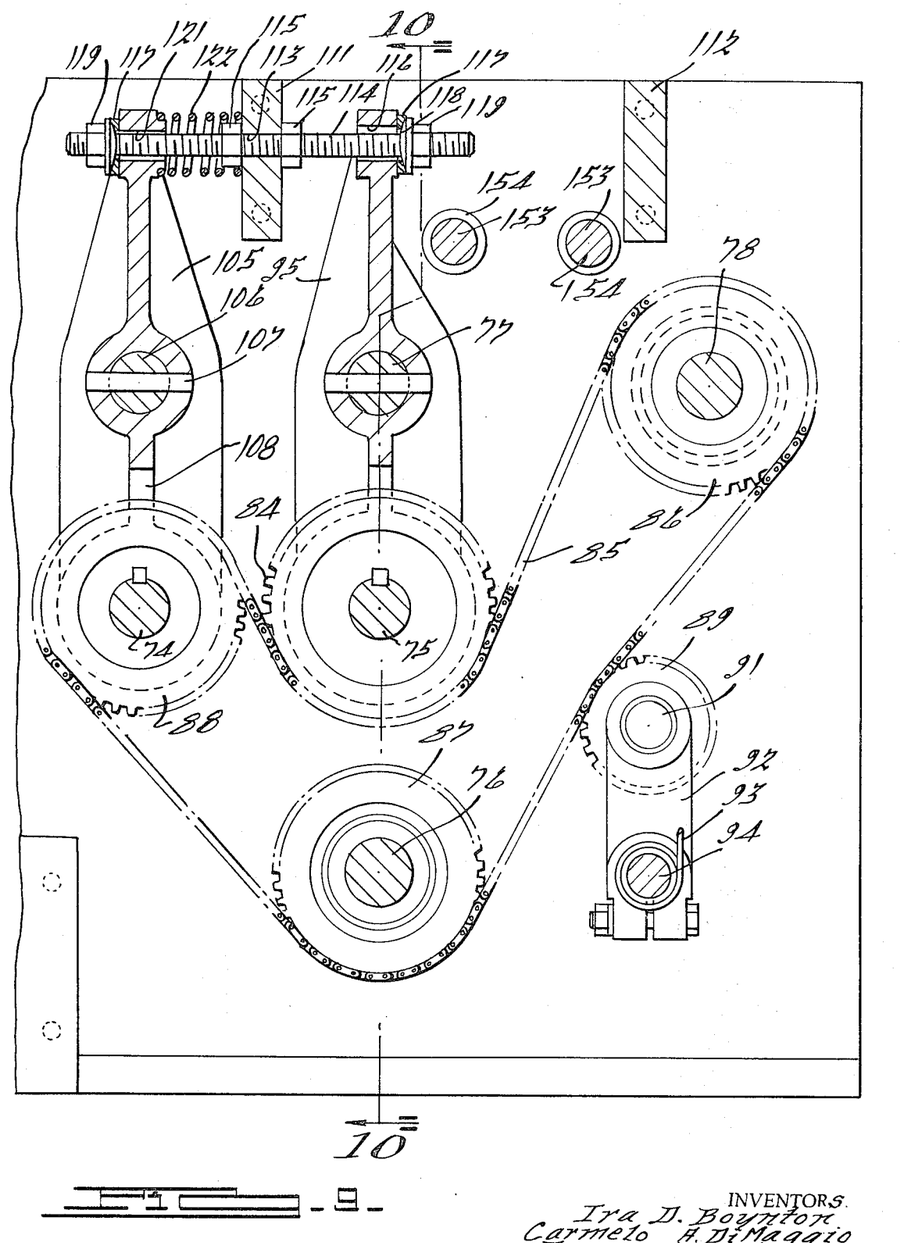
FIG. 9 is a broken sectional view of the structure illustrated in FIG. 8, taken on the line 9—9 thereof.

An air dancing section 26 and 27 is employed to produce an inertialess as possible infeed of the front web strips to the flute forming section. This is accomplished by passing the four slit strips leaving the slitter station 21 over an air pressure tube 28 which floats the strips on a current of air. The strips then pass downwardly and are reversed 180° around air pressure heads 31 and 32 which are disposed at angles to each other to separate the four strips into two pairs of spaced strips, as illustrated in FIG. 3. The four strips 33, 34, 35 and 36 form two pairs of strips 37 and 38 which are spaced apart.

The spaced pairs of strips 37 and 38 pass on a current of air from a tube 41 to an air dancer housing 42. The strips are suspended in catenary within the housing by the blowing of a stream of air downwardly against the strips. Air is supplied from a manifold 43 to conduits 44 to the tubes 41 and 45, the latter of which supports the turning and spacing heads 31 and 32. The air passes through openings 46 in the tubes 41 and 45 on the side adjacent to the strips with sufficient pressure to hold the strips out of contact with the tubes to free the strips of any tension or inertia. Air is supplied from a blower 47 to the dancing housing 42 from which it passes through openings 48 onto the two pair of strips 37 and 38 to suspend them as a catenary 49 therebelow.

The leading ends of the strips pass over an air emitting tube 51, which is similar to the tube 41, to retain the strips therabove. When the catenary moves upwardly to the position indicated by the line 52, a lamp 53 will actuate a photoelectric cell 54 and will actuate a device to cause the strips to be fed at a greater rate into the dancing housing 42 until the catenary moves below the line 55 whereupon the light from the lamp 56 will be cut off and the photoelectric cell 57 will be actuated to provide a signal to the device to reduce the feed speed of the strips to the dancing housing. In this manner the catenary will always be maintained within the housing between the lines 52 and 55. The tube 51 is supplied with air through a conduit 58 from the manifold 43 which is supplied with air from a blower 59. A conduit 61 supplies air from the manifold to the dancing tube 28. The pairs of strips 37 and 38 pass downwardly from the tube 51 into an oven 62 in which the flutes and pockets are formed, more specifically described and illustrated in FIGS. 6 to 10 inclusive. The pairs of spaced strips 37 and 38 pass downwardly to a pair of spaced rollers 64 having a series of groups of four spring fingers 65 on the periphery thereof. The ends of the fingers mate with groups of four notches 66 in a roller 67.

Figure 10:
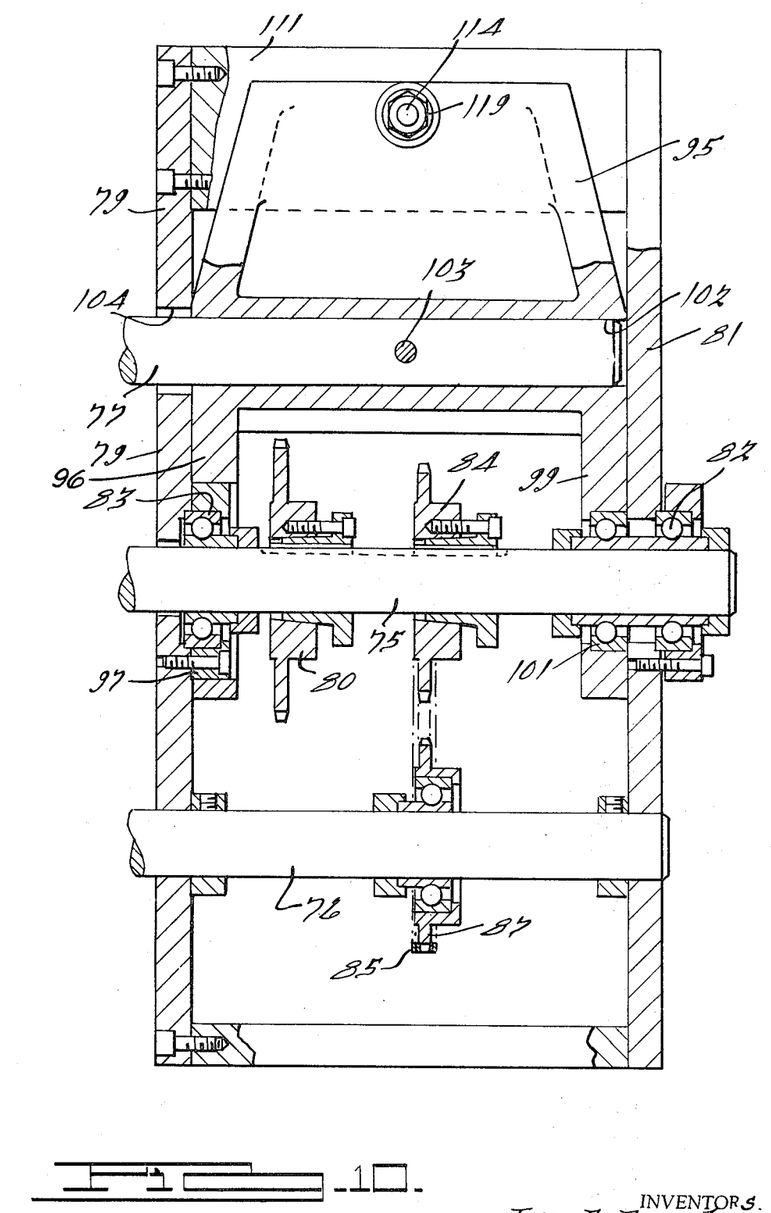
FIG. 10 is a broken sectional view of the structure illustrated in FIG. 9, taken on the line 10—10 thereof.

Rollers 68, 69 and 71 support a canvas belt 72 which is tracked thereon by a central band 73 mated with a groove 70 in the center of the rollers 68 and 69. The roller 64 is supported on a shaft 74, the roller 67 is supported on a shaft 75, the roller 68 is supported on a shaft 76, the roller 69 is supported on a shaft 77 and the roller 71 is supported on a shaft 78. The shafts 75, 76, 77 and 78 are suspended in cantilever within the oven 62 from spaced plates 79 and 81 on which the oven is supported. The shaft 75 is supported by bearings 82 and 83 on the plates 81 and 79, respectively. The shaft 75 is driven by a sprocket 80 from a driving motor, not shown. A sprocket 84 on the shaft 75 drives a chain 85 which drives a sprocket 86 freely rotatable on the shaft 78, a sprocket 87 freely rotatable on the shaft 76, and a sprocket 88 on the shaft 74. A sprocket 89 controls the tension on the chain 85 being mounted on a stub shaft 91 on a pivoted arm 92, which is urged counterclockwise by a spring 93 about a supporting shaft 94. A lever 95 is bifurcated at its lower end, one arm 96 being pivoted on a support 97 of the bearing 83 for the shaft 75, as illustrated in FIG. 10. The opposite arm 99 is supported on an inner race 101 of the bearing 82 for the shaft 75. The shaft 77 is supported in an aperture 102 in the lever 95 being secured against relative rotation by a pin 103. It will be noted that the shaft 77 extends through a large aperture 104 through the wall 79 to permit it to be adjusted in an arc about the center of the shaft 75.

A lever 105, similar to the lever 95, is mounted on a shaft 106 which is journaled in the plates 79 and 81. The shaft 106 is secured against rotation in an aperture in the lever 105 by a pin 107. The lower end of the lever 105 is bifurcated, each arm 108 supporting a ball bearing, not shown, which supports the shaft 74. Thus all of the shafts 74, 75, 76 and 78 are supported on the plates 79 and 81 and are driven by the chain 85. The shaft extends into the oven 62 and supports the rollers in cantilever therewith to permit ready application and removal of the belts. The plates 79 and 81 are interconnected by spacing bars 111 and 112. The spacing bar 111 has an aperture 113 through which a threaded rod 114 extends being disposed in fixed relation thereto by a pair of nuts 115. One end of the threaded rod extends through an aperture 116 in the end of the lever 95 which is engaged by washer 117 having a concave face in contact with a convex face 118 of a nut 119. By tightening the nut 119, the shaft 77 is swung to the left about the shaft 75 to shift the roller 69 to the left as viewed in FIG. 6 to thereby tighten the belt 72.

A similar washer 117 and nut 119 are supported on the opposite end of the threaded rod 114 which extends through an aperture 121 in the lever 105. Upon tightening the similar nut 119 the lever 105 and the shaft 106 are advanced against a spring 122 to thereby swing the shaft 88 about the center of the shaft 106 to position the fingers 65 relative to the notches 66 in the roller 67. The spring 122 urges the lever 105 in a clockwise direction when the similar nut 119 is screwed outwardly on the rod 114. The spring pressed sprocket 89 takes up any slack or permits the lengthening of the chain 85 when the levers 95 and 105 are adjusted in this manner. The roller 69 is supported for free rotation on the extending shaft 77 within the oven 62 by a pair of bearings 123. The roller 68 is supported for free rotation on the extending shaft 76 within the oven on a pair of bearings 124. The rollers 67, 68 and 69 are supported within the oven in vertically aligned adjacent relationship.

The roller 67 has passageways 125 disposed parallel to the axis of the roller from which a plurality of passageways 126 extend to the bottom of the notches 66. A manifold 127 is urged against the left hand face of the roller 67 by a spring 128. The manifold has an annular passageway 129 which communicates with the plurality of passageways 125. An S-shaped suction conduit 131 has one end joined to the annular passageway 129, the opposite end being connected to a suction source which draws air from the annular passage 129, the passageways 125 and 126 to provide an inflow of air at the bottom of the notches 66. The roller 67 is so constructed as to have extending areas 130 into which the flap edge of the wider back strip 12 may extend as the front web is being fluted and adhered to the other portion of the back strip. Thus packages with or without a foldable flap may be processed through the machine.

The oven 62 is made from insulating panels, which include a hinged bottom panel 132, a top panel 133 and four wall panels 134, 135, 136 and 137. These panels are put together to form the cabinet with the wall panel 135 hinged so that the belts may be slid upon the rollers or removed therefrom for replacement or repair. A chamber 138 at the top of the oven 62 has a plurality of sheathed electric resistance heaters 139 supported by bolts 141 on an oven angle members 142. The sheathed heating elements are joined to electric conductors 143 on terminals 144 connected to the resistance elements 145 which are joined together at the opposite end. The heating elements 139 have a plurality of fins 146 welded, brazed or otherwise secured thereon for transferring heat to the air passed thereover.

The air is supplied by a blower 140 driven by a motor 147 and connected by a conduit 148 to a manifold 149 which directs the flow of air over the lengths of the heating elements. The opposite side of the chamber 138 has a downwardly extending outlet passageway 151 which directs the heated air into the oven 62 where it is drawn into the blower 140 and recirculated over fins 146 and the heating elements 139. With this arrangement the interior of the oven 62 is maintained at a temperature of approximately 300° F. Although, this temperature may be varied depending upon the type of material to be heat sealed.

To produce a seal to the bottom edge of the flutes to form the pockets, a pair of stub shafts 153 are supported in the plates 79 and 81 retained against endwise movement by collars 154. Each end of the stub shafts within the oven support a pair of sleeves 155 secured between split rings 156 which extend within annular grooves on the stub shafts. Outwardly extending arms 157 on the sleeves 155 support pulleys 158 over which a belt 159 extends. The pulleys 158 are mounted on stub shafts 161 which are secured to the arms by nuts 165. The pairs of sleeves 155 have inwardly extending arms 166 located one above the other between which a spring 167 is retained on pins 168. The belts 159 pass downwardly from the pulleys 158 adjacent to the oven wall 137 to wrap substantially 270° around the roller 67 on bearings 164 followed by a substantially 180° reverse bend about the roller 69 from which they pass over the other pulleys 158 adjacent to the wall 136. The spring 167 urges the left hand pulleys 158, as viewed in FIG. 6, upwardly and the right hand pulleys 158 downwardly. The left hand pulleys maintain the belts tight while the right hand pulleys urge the belts downwardly to produce pressure for a substantial length of the belts for sealing of the bottoms of the fluted front strips to the back strips to close the bottom of the pockets.

The two spaced pairs of strips 37 and 38 move downwardly along the outer surface of the front oven wall 137 to an opening 169 through which the groups of fingers 65 extend into engagement with the strips and notches 66 in the roller 67. The back strips 12 which have been split into four sections and spread apart to have two spaced pairs are aligned with the pairs of strips 37 and 38. The strips 12 are drawn through an opening 171 in the oven wall 136 by the canvas belt 72 and passed 180° about the roller 68. When passing therefrom to advance 270° about the roller 67, the four back strips 12 move into contact with the flutes of the four front strips 11 in the notches of the roller 67 and become heat sealed along the line of engagement at the top of the notches 66. The portions of the front strips 37 and 38 extending over the wide sections 172 between the groups of four notches 66 also are heat sealed to the strips 12 and provide areas in which the packets are severed from the completed strips.

The portions of the belts 159 progressively squeeze the two adjacent ends of the flutes of the pairs of front strips 37 and 38 to flatten them against the back strips 12 as the belts 159 leave the bearings 164 and move onto the roller 69. The belts 159 maintain this engaged relationship after the strips move from the roller 69 until they pass beyond the roller 71. The portion of the strips between the rollers 69 and 71 are pressed by the belts 159 providing further time to permanently heat seal the edges to close the flutes at the bottom and form pockets which are open at the top in all four strips. By having the front pairs of strips 37 and 38 floating on the air when being admitted to the area between the fingers 65 and the notches 66, there will be no resistance to the advancement of the front strips over the lands between the notches 66 and no excessive pull on the front strip material. Should more material be required the catenary in the dancing chamber 42 will control the advancement of the front strips thereto so that there will be no resistance to the movement of the pairs of strips 37 and 38 at the fingers 65. Once the material of the front strips has been inserted in the notches 66 in the rollers 67, the suction therein will retain the formed flutes in exact sinuous shape until they are heat sealed to the back strips 12.

After the back strips 12 leave the oven chamber 62 through an aperture 175, they are turned from a flat position to a vertical position and passed through the filling section where a condiment is delivered thereto. The structure and method of filling the pockets is illustrated, described and claimed in the patent to A. C. Hall et al., No. 3,199,551, issued Aug. 10, 1965 for Method and Apparatus for Filling Packages and assigned to the assignee of the present invention.

From the filling station the plurality of strips are directed into the closing station which progressively moves the top edge of the filled pockets against the rear strip in a direction normal thereto to form neat folds after which they are heat sealed to close the open ends. This is illustrated, described and claimed in the copending application of William P. Hidden, Ser. No. 498,683, filed Oct. 20, 1965, for Fluted Package Sealing Apparatus and assigned to the assignee of the present invention which issued into Pat. No. 3,432,990, dated Mar. 18, 1969. Thereafter, the strips are advanced through a folding device for the flap, if the flap width is added to the rear strips, where the flap is folded and sealed to the back of the rear strips after which the individual packets are severed from the strips, collected in cartons ready for shipment.

What is claimed is:

1. In a machine for producing pockets on strips of material, means for mounting a pair of rolls of sheet material having heat sealing properties, slitter means for separating the sheet into a plurality of front and rear strips, means for advancing the rear strips into a heated oven chamber, means for advancing the front strips on air cushions to a chamber where the strips are supported in catenaries, means for controlling the raised and lowered position of the catenary, means for advancing the floating strips to a pair of fluting rollers, one of which has fingers, the other being located in the oven and having notches into which the fingers urge the front strips to produce flutes, vacuum means within the notched roller for retaining the flutes within the notches, advancing means for contacting the rear strips with the fluted strips to produce the heat sealing thereof within the oven, means for folding one edge of the flutes against the rear strips and providing pressure contact for a substantial length of advancing movement for heat sealing the folded edges to form pockets on the rear strips.

2. In a machine for producing pockets on strips of material, means for mounting a pair of rolls of sheet material having heat sealing properties, slitter means for separating the sheet into a plurality of front and rear strips, means for advancing the rear strips into a heated oven chamber, means for advancing the front strips on air cushions to a chamber where the strips are supported in catenaries, means for controlling the raised and lowered position of the catenary, means for advancing the floating strips to a pair of fluting rollers, one of which located outside the oven chamber has fingers, the other of which located in the oven chamber has notches into which the fingers urge the front strips to produce flutes, vacuum means within the notched roller for retaining the flutes within the notches, advancing means for contacting the rear strips with the fluted strips to produce the heat sealing thereof within the oven, means for folding one edge of the flutes against the rear strips and providing pressure contact for a substantial length of advancing movement for heat sealing the folded edges to form pockets on the rear strips, and a compartment outside of said oven chamber for supporting and driving said rollers in cantilever within the oven.

3. In a pocket forming machine, means for advancing front and rear sheet material having heat sealing properties into the machine, means for slitting the sheet material into a plurality of front and rear strips, air supports over which the front strips are advanced, a catenary housing through which the front strips are advanced, means for controlling the degree of catenary in the strips, a driving housing for supporting a plurality of shafts, one shaft supporting a notched fluting roller, two other shafts supporting bearings, rollers on said bearing mounted for free rotation, a fourth shaft having bearings on which a third roller is freely rotated, a belt extending over said freely rotated rollers and about the notched fluting roller, a fifth shaft in said driving housing for supporting a roller having fingers engageable within the notches in said fluting roller, the inertialess front strips being advanced between the fingers and the notches of the fluting rollers to form the flutes, and vacuum means within the notched roller for retaining their flutes therewithin.

4. In a pocket forming machine, means for advancing front and rear sheet material having heat sealing properties into the machine, means for slitting the sheet material into a plurality of front and rear strips, air supports over which the front strips are advanced, a catenary housing through which the front strips are advanced, means for controlling the degree of catenary in the strips, a driving housing for supporting a plurality of shafts, one shaft supporting a notched fluting roller, two other shafts supporting bearings, rollers on said bearing mounted for free rotation, a fourth shaft having bearings on which a third roller is freely rotated, a belt extending over said freely rotated rollers and about the notched fluting roller, a fifth shaft in said driving housing for supporting a roller having fingers engageable within the notches in said fluting roller, the inertialess front strips being advanced between the fingers and the notches of the fluting rollers to form the flutes, and vacuum means within the notched roller for retaining their flutes therewithin, said belt advancing the rear strips around the notched roller in contact with the exposed edges of the flutes.

5. In a pocket forming machine, means for advancing front and rear sheet material having heat sealing properties into the machine, means for slitting the sheet material into a purality of front and rear strips, air supports over which the front strips are advanced, a catenary housing through which the front strips are advanced, means for controlling the degree of catenary in the strips, a driving housing for supporting a plurality of shafts, one shaft supporting a notched fluting roller, two other shafts supporting bearings, rollers on said bearing mounted for free rotation, a fourth shaft having bearings on which a third roller is freely rotated, a belt extending over said freely rotated rollers and about the notched fluting roller, a fifth shaft in said driving housing for supporting an element having fingers engageable within the notches in said fluting roller, the inertialess front strips being advanced between the fingers and the notches of the fluting rollers to form the flutes, and vacuum means within the notched roller for retaining their flutes therewithin, said belt advancing the rear strips around the notched roller in contact with the exposed edges of the flutes, a heated oven enclosing said rollers for heat sealing the engaged front and rear strips.

6. In a pocket forming machine, means for advancing front and rear sheet material having heat sealing properties into the machine, means for slitting the sheet material into a plurality of front and rear strips, air supports over which the front strips are advanced, a catenary housing through which the front strips are advanced, means for controlling the degree of catenary in the strips, a driving housing for supporting a plurality of shafts, one shaft supporting a notched fluting roller, two other shafts supporting bearings, rollers on said bearing mounted for free rotation, a fourth shaft having bearings on which a third roller is freely rotated, a belt extending over said freely rotated rollers and about the notched fluting roller, a fifth shaft in said driving housing for supporting an element having fingers engageable within the notches in said fluting roller, the inertialess front strips being advanced between the fingers and the notches of the fluting rollers to form the flutes, vacuum means within the notched roller for retaining their flutes therewithin, said belt advancing the rear strips around the notched roller in contact with the exposed edges of the flutes, a heated oven enclosing said rollers for heat sealing the engaged front and rear strips, an additional pair of shafts supported in the driving housing and oven, pulleys on said additional shafts within said oven, and belts on said pulleys and about said notched roller and the roller thereabove for folding one edge of said flutes and heat sealing the folds to the rear strip.

7. In a pocket forming machine, means for advancing front and rear sheet material having heat sealing properties into the machine, means for slitting the sheet material into a plurality of front and rear strips, air supports over which the front strips are advanced, a catenary housing through which the front strips are advanced, means for controlling the degree of catenary in the strips, a driving housing for supporting a plurality of shafts, one shaft supporting a notched fluting roller, two other shafts supporting bearings, rollers on said bearing mounted for free rotation, a fourth shaft having bearings on which a third roller is freely rotated, a belt extending over said freely rotated rollers and about the notched fluting roller, a fifth shaft in said driving housing for supporting an element having fingers engageable within the notches in said fluting roller, the inertialess front strips being advanced between the fingers and the notches of the fluting rollers to form the flutes, vacuum means within the notched roller for retaining their flutes therewithin, said belt advancing the rear strips around the notched roller in contact with the exposed edges of the flutes, a heated oven enclosing said rollers for heat sealing the engaged front and rear strips, an additional pair of shafts supported in the driving housing and oven, pulleys on said additional shafts within said oven, belts on said pulleys and about said notched roller and the roller thereabove for folding one edge of said flutes and heat sealing the folds to the rear strip, and spring means for urging one set of pulleys in a direction to tighten the belts and the other set of pulleys to apply pressure between the folded ends of front strips and rear strips.

8. In a pocket forming machine, means for advancing front and rear sheet material having heat sealing properties into the machine, means for slitting the sheet material into a plurality of front and rear strips, air supports over which the front strips are advanced, a catenary housing through which the front strips are advanced, means for controlling the degree of catenary in the strips, a driving housing for supporting a plurality of shafts, one shaft supporting a notched fluting roller, two other shafts supporting bearings, rollers on said bearing mounted for free rotation, a fourth shaft having bearings on which a third roller is freely rotated, a belt extending over said freely rotated rollers and about the notched fluting roller, a fifth shaft in said driving housing for supporting an element outside a heated oven having fingers engageable within the notches in said fluting roller, the inertialess front strips being advanced between the fingers and the notches of the fluting rollers to form the flutes, vacuum means within the notched roller for retaining their flutes therewithin, said belt advancing the rear strips around the notched roller in contact with the exposed edges of the flutes, said heated oven enclosing said rollers for heat sealing the engaged front and rear strips, an additional pair of shafts supported in the driving housing and oven, pulleys on said additional shafts within said oven, belts on said pulleys and about said notched roller and the roller thereabove for folding one edge of said flutes and heat sealing the folds to the rear strip, spring means for urging one set of pulleys in a direction to tighten the belts and the other set of pulleys to apply pressure between the folded ends of front strips and rear strips, means for driving the shaft of the notched fluting roller, and means driven by the notched fluted roller shaft for driving the other rollers in synchronism.

9. In a pocket forming machine, means for advancing front and rear sheet material having heat sealing properties into the machine, means for slitting the sheet material into a plurality of front and rear strips, air supports over which the front strips are advanced, a catenary housing through which the front strips are advanced, means for controlling the degree of catenary in the strips, a driving housing for supporting a plurality of shafts, one shaft supporting a notched fluting roller, two other shafts supporting bearings, rollers on said bearing mounted for free rotation, a fourth shaft having bearings on which a third roller is freely rotated, a belt extending over said freely rotated rollers and about the notched fluting roller, a fifth shaft in said driving housing for supporting an element outside a heated oven having fingers engageable within the notches in said fluting roller, the inertialess front strips being advanced between the fingers and the notches of the fluting rollers to form the flutes, vacuum means within the notched roller for retaining their flutes therewithin, said belt advancing the rear strips around the notched roller in contact with the exposed edges of the flutes, said heated oven enclosing said rollers for heat sealing the engaged front and rear strips, an additional pair of shafts supported in the driving housing and oven, pulleys on said additional shafts within said oven, belts on said pulleys and about said notched roller and the roller thereabove for folding one edge of said flutes and heat sealing the folds to the rear strip, spring means for urging one set of pulleys in a direction to tighten the belts and the other set of pulleys to apply pressure between the folded ends of front strips and rear strips, means for driving the shaft of the notched fluting roller, means driven by the notched fluted roller shaft for driving the other rollers in synchronism, and means for adjusting the roller having the fingers thereon to and from the notched fluting rollers.

10. In a pocket forming machine, means for advancing front and rear sheet material having heat sealing properties into the machine, means for slitting the sheet material into a plurality for front and rear strips, air supports over which the front strips are advanced, a catenary housing through which the front strips are advanced, means for controlling the degree of catenary in the strips, a driving housing for supporting a plurality of shafts, one shaft supporting a notched fluting roller, two other shafts supporting bearings, rollers on said bearing mounted for free rotation, a fourth shaft having bearings on which a third roller is freely rotated, a belt extending over said freely rotated rollers and about the notched fluting roller, a fifth shaft in said driving housing for supporting an element outside said oven having fingers engageable within the notches in said fluting roller, the inertialess front strips being advanced between the fingers and the notches of the fluting rollers to form the flutes, vacuum means within the notched roller for retaining the flutes therewithin, said belt advancing the rear strips around the notched roller in contact with the exposed edges of the flutes, a heated oven enclosing said rollers for heat sealing the engaged front and rear strips, an additional pair of shafts supported in the driving housing and oven, pulleys on said additional shafts within said oven, belts on said pulleys and about said notched roller and the roller thereabove for folding one edge of said flutes and heat sealing the folds to the rear strip, spring means for urging one set of pulleys in a direction to tighten the belts and the other set of pulleys to apply pressure between the folded ends of front strips and the rear strips, means for driving the shaft of the notched fluting roller, means driven by the notched fluted roller shaft for driving the other rollers in synchronism, means for adjusting the roller having the fingers thereon to and from the notched fluting rollers, and means for adjusting the roller adjacent to the notched fluting roller for tensioning the belt about the latter roller.

11. A machine for forming pockets in a strip of material, an oven, heating means for heating said oven to sealing temperature, a notched fluting roller in said oven, three additional rollers in said oven two of which are substantially vertically aligned above and below the notched fluting roller, a continuous belt passing sinuously about the upper and lower roller and the notched fluting roller and about the third roller, aligned pulleys above said rollers, a belt on said pulleys passing around the upper roller and about the notched fluting roller, and a finger fluting roller outside said oven having the finger ends passing within the notches when the fluting rollers are driven in synchronism, said fluting rollers advancing a front strip of material to form flutes within the notches.

12. A machine for forming pockets in a strip of material, an oven, heating means for heating said oven to sealing temperature, a notched fluting roller in said oven, three additional rollers in said oven two of which are substantially vertically aligned above and below the notched fluting roller, a continuous belt passing sinuously about the upper and lower roller and the notched fluting roller and about the third roller, aligned pulleys above said rollers, a belt on said pulleys passing around the upper roller and about the notched fluting roller, a finger fluting roller outside said oven having the finger ends passing within the notches when the fluting rollers are driven in synchronism, said fluting rollers advancing a front strip of material to form flutes within the notches, and means providing a vacuum within the notched fluting roller for retaining the flutes therewithin.

13. A machine for forming pockets in a strip of material, an oven, heating means for heating said oven to sealing temperature, a notched fluting roller in said oven, three additional rollers in said oven two of which are substantially vertically aligned above and below the notched fluting roller, a belt passing sinuously about the upper and lower roller and the notched fluting roller and about the third roller, aligned pulleys above said rollers, a continuous belt on said pulleys passing around the upper roller and about the notched fluting roller, a finger fluting roller outside said oven having the finger ends passing within the notches when the fluting rollers are driven in synchronism, said fluting rollers advancing a front strip of material to form flutes within the notches, means providing a vacuum within the notched fluting roller for retaining the flutes therewithin, the belt around the rollers feed a back strip into engagement with the portions of the flutes at the top of the notches which become heat sealed thereto to form open ended pockets.

14. A machine for forming pockets in a strip of material, an oven, heating means for heating said oven to sealing temperature, a notched fluting roller in said oven, three additional rollers in said oven two of which are substantially vertically aligned above and below the notched fluting roller, a belt passing sinuously about the upper and lower roller and the notched fluting roller and about the third roller, aligned pulleys above said rollers, a continuous belt on said pulleys passing around the upper roller and about the notched fluting roller, a finger fluting roller outside said oven having the finger ends passing within the notches when the fluting rollers are driven in synchronism, said fluting rollers advancing a front strip of material to form flutes within the notches, means providing a vacuum within the notched fluting roller for retaining the flutes therewithin, the belt around the rollers feeding a back strip into engagement with the portions of the flutes at the top of the notches which become heat sealed thereto to form open ended pockets, the belts about the pulleys engage the bottom edge of the flutes to progressively fold them toward and against the back strip which produces the heat sealing thereof to close one end of the pockets 15. In a device for fluting a strip of material, fluting rollers which advance the material to form the flutes, means for advancing the strip to the rollers, a chamber through which the strip passes, air means in the chamber for deflecting the strip into the shape of a catenary, means for increasing the rate of feed of the strip through the chamber in an upper bosition of the catenary, and means for reducing the rate of feed of the strip through the chamber at a lower position of the catenary said means being actuatable by the position of the catenary.

16. In a device for fluting a strip of material, fluting rollers which advance the material to form the flutes, means for advancing the strip to the rollers, a chamber through which the strip passes, air means in the chamber for deflecting the strip into the shape of a catenary, means for increasing the rate of feed of the strip through the chamber in an upper position of the catenary, means for reducing the rate of feed of the strip through the chamber at a lower position of the catenary, said means being actuatable by the position of the catenary, and means for supporting the strip at each end of the chamber on a current of air.

17. A machine for forming pockets in a strip of material, an oven, heating means for heating said oven to sealing temperature, a notched fluting roller in said oven, three additional rollers in said oven two of which are substantially vertically aligned above and below the notched fluting roller, a continuous belt passing sinuously about the upper and lower roller and the notched fluting roller and about the third roller, aligned pulleys above said rollers, a belt on said pulleys passing around the upper roller and about the notched fluting roller, a finger fluting roller outside said oven having the finger ends passing within the notches when the fluting rollers are driven in synchronism, said fluting rollers advancing a front material strip of material to form flutes within the notches, means providing a vacuum within the notched fluting roller for retaining the flutes therewithin, the belt around the rollers feeding a back strip into engagement with the portions of the flutes at the top of the notches which become heat sealed thereto to form open ended pockets, the belts about the pulleys engage the bottom edge of the flutes to progressively fold them toward and against the back strip which produces the heat sealing thereto to close one end of the pockets, and means for adjusting the finger fluting roller relative to the notch fluting roller.

18. A machine for forming pockets in a strip of material, an oven, heating means for heating said oven to sealing temperature, a notched fluting roller in said oven, three additional rollers in said oven two of which are substantially vertically aligned above and below the notched fluting roller, a belt passing sinuously about the upper and lower roller and the notched fluting roller and about the third roller, aligned pulleys above said rollers, a continuous belt on said pulleys passing around the upper roller and about the notched fluting roller, a finger fluting roller outside said oven having the finger ends passing within the notches when the fluting rollers are driven in synchronism, said fluting rollers advancing a front strip of material to form flutes within the notches, means providing a vacuum within the notched fluting roller for retaining the flutes therewithin, the belt around the rollers feeding a back strip into engagement with the portions of the flutes at the top of the notches which become heat sealed thereto to form open ended pockets, the belts about the pulleys engage the bottom edge of the flutes to progressively fold them toward and against the back strip which produces the heat sealing thereof to close one end of the pockets, means for adjusting the finger fluting roller relative to the notched fluting roller, and means for adjusting the upper roller in an arc about the notched roller to change the tension of the belts.

References Cited

UNITED STATES PATENTS

| | | | |
|---|---|---|---|
| Re. 24,361 | 9/1957 | Brown | 161—122 |
| 2,429,482 | 10/1947 | Munters | 156—208 |
| 2,480,316 | 8/1949 | Blair et al. | 156—205 |
| 2,826,020 | 3/1958 | Hoag | 53—28 |
| 3,199,551 | 8/1965 | Hall et al. | 141—83 |
| 3,324,570 | 6/1967 | Flaith et al. | 34—156 |

JOHN T. GOOLKASIAN, Primary Examiner

H. F. EPSTEIN, Assistant Examiner

U.S. Cl. X.R.

34—156; 156—360, 361, 381, 382, 462, 472, 596

UNITED STATES PATENT OFFICE
CERTIFICATE OF CORRECTION

Patent No. 3,516,889  June 23, 1970

Ira D. Boynton et al.

It is certified that error appears in the above identified patent and that said Letters Patent are hereby corrected as shown below:

Column 1, line 57, "flute" should read -- flutes --. Column 4, line 73, cancel "an". Column 5, line 11, after "over" insert -- the --. Column 9, line 44, "for" should read -- of --; line 56, "said oven" should read -- a heated oven --; line 62, "a" should read -- said --. Column 11, line 7, "bosition" should read -- position --; line 36, cancel "material", first occurrence; line 45, "thereto" should read -- thereof --. Column 12, line 28, "of" should read -- on --.

Signed and sealed this 13th day of October 1970.

(SEAL)
Attest:

Edward M. Fletcher, Jr.
Attesting Officer

WILLIAM E. SCHUYLER, JR.
Commissioner of Patents